US006708327B1

(12) United States Patent
Aliphas

(10) Patent No.: US 6,708,327 B1
(45) Date of Patent: Mar. 16, 2004

(54) SYSTEM FOR ACCESSING AND TESTING EVALUATION MODULES VIA A GLOBAL COMPUTER NETWORK

(75) Inventor: Amnon Aliphas, Newton, MA (US)

(73) Assignee: TechOnLine, Inc., Bedford, MA (US)

( * ) Notice: Subject to any disclaimer, the term of this patent is extended or adjusted under 35 U.S.C. 154(b) by 0 days.

(21) Appl. No.: 09/417,591

(22) Filed: Oct. 14, 1999

(51) Int. Cl.[7] .................................................. G06F 9/44
(52) U.S. Cl. ...................................... 717/125; 717/134
(58) Field of Search ........................ 717/125, 124–135; 345/700, 733, 736, 748; 714/25, 37, 38, 47, 46, 742; 702/108, 123; 709/200, 310

(56) References Cited

U.S. PATENT DOCUMENTS

| | | | | | |
|---|---|---|---|---|---|
| 5,367,667 A | * | 11/1994 | Wahlquist et al. | ............ | 714/31 |
| 5,630,049 A | * | 5/1997 | Cardoza et al. | ............... | 714/25 |
| 5,664,115 A | | 9/1997 | Fraser | .......................... | 705/37 |
| 5,671,284 A | | 9/1997 | Rosen | .......................... | 380/24 |
| 5,699,528 A | | 12/1997 | Hogan | ........................ | 395/240 |
| 5,732,400 A | | 3/1998 | Mandler | ....................... | 705/26 |
| 5,742,754 A | * | 4/1998 | Tse | ............................. | 714/38 |
| 5,745,884 A | | 4/1998 | Carnegie | ..................... | 705/34 |
| 5,958,007 A | * | 9/1999 | Lee et al. | .................... | 709/217 |
| 6,154,128 A | * | 11/2000 | Wookey et al. | ............... | 700/17 |
| 6,199,193 B1 | * | 3/2001 | Oyagi et al. | ................. | 717/101 |
| 6,260,160 B1 | * | 7/2001 | Beyda et al. | .................. | 714/27 |
| 6,385,739 B1 | * | 5/2002 | Barton et al. | ................. | 714/25 |

OTHER PUBLICATIONS

Boegh. Evaluation Modules: The Link between Theory and Practice. IEEE. 1995. pp. 170–174.*
Wertz. The Design of An Integrated, Interactive and Incremental Programming Environment. IEEE. 1982. pp. 157–165.*
Microsoft Press Computer Dictionary. Thrid Edition. 1997. p. 210.*
"Real Time Streaming Protocol (RTSP) Request For Comments: 2326," H. Schulzrinne et al., The Internet Society (Apr. 1998) available at http://www.jetf.org/rfc2326.txt-?number=2326. (Accessed on Feb. 6, 2002).

* cited by examiner

Primary Examiner—Wei Zhen
(74) Attorney, Agent, or Firm—Finnegan, Henderson, Farabow, Garrett & Dunner, L.L.P.

(57) ABSTRACT

The present invention is a system for facilitating the access by an end user to a component to be tested via a global computer network comprising an interface for enabling an end user to access a central computer network in communication with a component to be tested, said component to be tested residing on a second computer, means for interfacing the central computer network with the component to be tested on the second computer, means for enabling the end user to test the component to be tested on the second computer via the interface means and the central computer network, and means for transferring a result executed by the component on the second computer through the central computer network and to the end user.

22 Claims, 12 Drawing Sheets

TECHONLINE TMS320C3x VIRTUALAB — 52

WELCOME TO *TECHONLINE'S* ON-LINE TMS320C3x DSP LAB. YOU MAY COMPILE AND LINK YOUR OWN "C" CODE OR READILY AVAILABLE SAMPLE CODE ON-LINE AND RUN ONE OF THE PC-RESIDENT HARDWARE DEBUGGERS.

- COMPILE SAMPLE C CODE — 54
- COMPILE YOUR OWN C CODE — 56
- ACCESS THE EVMS DIRECTLY — 58

AUDIO ASSISTANCE
TEXT ASSISTANCE

© COPYRIGHT 1996 TECHONLINE, INC.
ALL RIGHTS RESERVED.

SUGGESTED STEPS:

- COMPILE - EITHER YOUR OWN "C" CODE OR SAMPLE CODE WITH THE OPTIONS YOU WANT.
- DOWNLOAD THE C CODE TO THE EVM.
- ACCESS THE EVM TO TEST AND BENCHMARK YOUR CODE.
- MAKE SURE YOUR WEB BROWSER SUPPORTS JAVA OR HAS TELNET CAPABILITIES.

— 50

| HELP | 60 |
|------|----|
| AUDIO | |
| TEXT | |
| FAQ | |

COMPILING SAMPLE CODE FOR EVM

HERE IS THE SAMPLE CODE WHICH YOU WILL NOW COMPILE:

```
/*
* TEST.C - C PROGRAM TO SHOW OFF TMS320 FLOATING-POINT C COMPILER
*/

#DEFINE LEN   100

FLOAT x[LEN];
FLOAT y[LEN];

FLOAT CORRELATION (FLOAT; *x, FLOAT *y, INT SIZE)

/*
*DSP ALGORITHM: CORRELATION
*OPTIMIZER WILL IMPLEMENT THIS CORRELATION (DOT PRODUCT) WITH A
*ZERO OVERHEAD LOOP AND USE POST INCREMENT ADDRESSING
*HERE THE COMPILER ACHIEVES A ONE-TO-ONE RATIO OF C COMPILED
*ASSEMBLY CODE TO HAND-CODED ASSEMBLY CODE BY USING A PARALLEL
*MAC INSTRUCTION
*/
      INT i;
      FLOAT RESULT = 0.0;
      FOR(i=0;i< SIZE;i++) RESULT += x[i] *y[i];
      RETURN(RESULT);

VOID MAIN (VOID)

INT i;
      FLOAT CROSSCORRELATION = 0.0;

/*
*INITIALIZE ARRAYS. HERE THE OPTIMIZER WILL IMPLEMENT A PARALLEL
*STORE IN A ZERO OVERHEAD LOOP.
*/
      FOR (i=0;i<LEN;i++)

x[i] = y[i] = 0.0;

CROSSCORRELATION = CORRELATION (x,y,LEN);
```

PLEASE SELECT ANY OF THE FOLLOWING OPTIONS:

⬚ VIEW ASSEMBLY CODE — 64
⬚ VIEW INTERLIST OF SOURCE & ASSEMBLY CODE
⬚ VIEW SIZE OF OBJECT CODE
⬚ LINK CODE TO MAKE LOAD MODULE — 66
⬚ INCLUDE RUN-TIME SUPPORT LIBRARY
⬚ VIEW SIZE OF LOAD MODULE (AFTER LINKING) — 68
⬚ HELP — 70

*FIG. 5*

COMPILE/LINK RESULTS

FRI AUG 27 08:58:12 EDT 1999

FOR THE OPTIONS YOU CHOSE, THE COMMAND LINE YOU WOULD USE WOULD BE:

cl30 FUNCTION.c

COMPILER OUTPUT
[FUNCTION.C]
TMS320C3x/4x ANSI C COMPILER VERSION 4.60
COPYRIGHT (c) 1987-1995 TEXAS INSTRUMENTS INCORPORATED
    "FUNCTION.c" ==> MAIN
    "FUNCTION.c" ==> ABS_FUNC
TMS320C3x/4x C CODE GENERATOR VERSION 4.60
COPYRIGHT (c) 1987-1995 TEXAS INSTRUMENTS INCORPORATED
    "FUNCTION.c" ==> MAIN
    "FUNCTION.c" ==> ABS_FUNC
TMS320C3x/4x COFF ASSEMBLER VERSION 4.60
COPYRIGHT (c) 1987-1995 TEXAS INSTRUMENTS INCORPORATED
    PASS 1
    PASS 2

NO ERRORS, NO WARNINGS

IF YOU ARE SATISFIED WITH THE RESULTS OF YOUR COMPILATION, YOU MAY PROCEED TO THE EVM WHERE YOU CAN RUN THE CODE ON ACTUAL HARDWARE.

REMEMBER! THE NAME OF YOUR CODE IS FUNCTION.

ACCESS EVM

*FIG. 6*

TELNET GATEWAY TO EVM
ADD THIS INSTRUCTION PAGE TO YOUR BOOKMARK LIST!
• STEP-BY-STEP INSTRUCTIONS
• CONNECT TO EVM
• EVM COMMAND SUMMARY

STEP-BY-STEP INSTRUCTIONS

HERE IS A LIST OF COMMANDS THAT YOU CAN TYPE TO LOAD A SAMPLE PROGRAM AND BENCHMARK ITS PERFORMANCE.

| EVM COMMAND | COMMENTS |
|---|---|
| RESET | (RESET THE EVM HARDWARE) |
| LOAD SAMPLE | (LOADS OBJECT CODE FILE "SAMPLE.OUT") |
| MIX | (DEBUG IN MIXED MODE – ASM & C) |
| GO MAIN | (RUN THE PROGRAM UP TO THE ROUTINE "MAIN") |
| win FILE | (MAKE THE SOURCE FILE WINDOW ACTIVE) |
| (DOWN ARROW KEY) | (USE ARROW KEYS TO SCROLL DOWN TO LINE 38) |
| BA MEMINIT | (ADD BREAKPOINT TO MEMINIT FUNCTION CALL) |
| (DOWN ARROW KEY) | (USE ARROW KEYS TO SCROLL DOWN TO LINE 46) |
| (TYPE ESC F 9) | (ESC LETTER-F NUMBER-9 ADDS BREAKPOINT AT CURRENT LINE) |
| RUN | (RUN TO FIRST BREAKPOINT – MEMINIT) |
| RUNB | (RUN BENCHMARK UP TO SECOND BREAKPOINT) |
| ? CLK | (EXAMINE # OF CLOCK CYCLES IN CLK PSEUDOREGISTER) |

THIS IS A SIMPLE BENCHMARKING EXERCISE. FEEL FREE TO SOME OF THE COMMANDS LISTED IN THE EVM COMMAND SUMMARY WHILE YOU'RE IN THE DEBUGGER.

NOTE: IF YOU TYPE "RUN" WITHOUT SETTING BREAKPOINTS THE PROGRAM LOOPS INDEFINTELY. TO HALT A PROGRAM TYPE "ESC E"

CONNECT TO EVM

CURRENT LOCAL TIME ON THIS SERVER IS FRI AUG 27 08:58:36 EDT 1999

CONNECT TO C3X EVM WITH AUDIO HELP
CONNECT TO C3X EVM WITH TEXT HELP ⎯ 72
LOGIN WITH USERNAME EVM1
AND HIT 'ENTER' FOR PASSWORD.

*IMPORTANT!* WHEN YOU ARE FINISHED WITH YOUR SESSION TYPE CTRL-] (CONTROL-KEY WITH RIGHT-BRACKET KEY) TO RETURN TO THE TELNET PROMPT. AT THE TELNET PROMPT TYPE "QUIT" TO CLOSE YOUR SESSION.

*FIG. 7*

EVM COMMAND SUMMARY

HERE IS A SHORT LIST OF COMMONLY USED EVM COMMANDS. WHILE THIS LIST IS NOT EXHAUSTIVE IT DOES PROVIDE SOME IDEAS FOR "TEST-DRIVING" THE EVM.

RESET
  RESETS THE 'C3X PROCESSOR.

LOAD FILENAME
  LOAD THE C3X CODE IN FILE "FILENAME" INTO THE EVM.

QUIT
  EXIT THE DEBUGGER.

RESTART
  RESET THE PROGRAM COUNTER TO THE PROGRAM'S ENTRY POINT.

**GO *ADDRESS***
  EXECUTE CODE UP TO *ADDRESS*. EXAMPLE: GO *MAIN* RUNS THE CODE UP TO THE ROUTINE "MAIN".

**RUN *[EXPRESSION]***
  RUN THE PROGRAM UP TO *EXPRESSION*. IF NO EXPRESSION IS SUPPLIED THE PROGRAM WILL RUN UNTIL IT ENCOUNTERS A BREAKPOINT OR IS STOPPED BY THE USER BY PRESSING THE ESCAPE-KEY.

RUNB
  RUN A BENCHMARK. THE PROGRAM WILL EXECUTE AND THE NUMBER OF CLOCK CYCLES CONSUMED WILL BE DISPLAYED IN THE CLK PSEUDO-REGISTER. *THE EXECUTION MUST BE HALTED BY A BREAKPOINT.*

BR
  RESET (DELETE) ALL BREAKPOINTS.

**BA *ADDRESS***
  ADD BREAKPOINT AT *ADDRESS*. THE ADDRESS CAN BE AN ABSOLUTE ADDRESS, ANY C EXPRESSION, THE NAME OF A C FUNCTION, OR THE NAME OF AN ASSEMBLY LANGUAGE LABEL.

**BD *ADDRESS***
  DELETE BREAKPOINT.

BL
  LIST BREAKPOINTS

**WA *EXPRESSION [,[LABEL],FORMAT]***
  ADD WATCH. DISPLAYS THE VALUE OF *EXPRESSION* IN A WATCH WINDOW. THE EXPRESSION CAN BE ANY C EXPRESSION. THE LABEL FIELD IS OPTIONAL AND ALLOWS YOU TO SET A USER DEFINED LABEL ON THIS WATCH. THE DISPLAY *FORMAT* CAN BE UP TO TEN DIFFERENT TYPES. EXAMPLES:
  - WATCH PROGRAM COUNTER IN DECIMAL FORMAT: wa PC,,d
  - WATCH C VARIABLE "COUNT" IN HEXADECIMAL FORMAT: wa COUNT,,x

*FIG. 8* wd *INDEX_NUMBER*
> DELETE WATCH ITEM. THE *INDEX_NUMBER* MUST CORRESPOND TO ONE OF THE WATCH INDEXES LISTED IN THE WATCH WINDOW.

STEP *[EXPRESSION]*
> STEP THROUGH *[EXPRESSION]* C OR ASSEMBLY STATEMENTS. IF *[EXPRESSION]* IS OMITTED A DEFAULT VALUE OF 1 (SINGLE-STEP) IS USED.

WHATIS *SYMBOL*
> SHOWS THE DATA TYPE OF *SYMBOL*. THE SYMBOL CAN BE ANY VARIABLE, A FUNCTION NAME, STRUCTURE TAG, TYPEDEF NAME, OR ENUMERATION CONSTANT.

CLS
> CLEAR THE COMMAND WINDOW win *WINDOW_NAME*
> MAKE WINDOW *WINDOW_NAME* THE ACTIVE WINDOW. ( THE ACTIVE WINDOW CAN BE SCROLLED USING ARROW KEYS.)
> ALLOWABLE WINDOW NAMES ARE:
> - DISASSEMBLY
> - FILE
> - CALL
> - MEMORY
> - COMMAND
> - CPU
>
> THE WINDOW NAME NEEDS ONLY TO BE TYPED LONG ENOUGH TO AVOID AMBIGUITY.
> (E.G. win DISA WILL UNIQUELY DETERMINE THE DISASSEMBLY WINDOW.)

? *EXPRESSION*
> EVALUATE *EXPRESSION*. EXAMPLE: "? clk" EVALUATES THE PSEUDOREGISTER "clk" WHICH IS USED TO COUNT CLOCK CYCLES WHEN BENCHMARKING CODE.

SYSTEM FOR ACCESSING AND TESTING EVALUATION MODULES VIA A GLOBAL COMPUTER NETWORK

FIELD OF THE INVENTION

The present invention is directed to online computer systems. In particular, the present invention is specifically directed to online systems for enabling an end user to test and evaluate an electronic, software or computer component such as an evaluation module (EVM).

BACKGROUND OF THE INVENTION

The present invention is directed to providing end users with access to electronic, software and hardware components, and most particularly to so-called Evaluation Modules ("EVM's) via a worldwide computer network. The Internet or World Wide Web is one of the most critical technological developments of the 1990's. The Internet has provided vast economic opportunities for numerous businesses and industries to vastly expand the number and quality of their services.

One of the earliest and fastest emerging areas of Internet activity has been in providing rapid, up-to-the-minute business information and the facilitation of electronic commerce applications. To date, a number of patents have issued on Internet related systems, covering a wide array of applications.

U.S. Pat. No. 5,699,528 for example, discloses a bill delivery and payment system in which users access a server computer on a communications network to obtain billing information and to pay bills. Using a computer, the users access a website provided by the server to view the bill information and to instruct the server computer regarding the details of bill payment.

U.S. Pat. No. 5,664,115 discloses a method and apparatus of automatically matching sellers of property with potential buyers through a communications network such as the Internet in which a host system communicates with sellers and potential buyers over telephone or dedicated data transmission lines. The central server obtains and stores a first set of records each corresponding to a property to be sold. A set of records can then be searched by a remote data terminal associated with the potential buyer. The results of the search are then provided to the potential buyer who then indicates specific property listings that the potential buyer may be interested in purchasing.

U.S. Pat. No. 5,671,280 is directed to a system for electronic commercial payment having a customer trusted agent associated with a money module agent that establishes a secure session with the customer and the money module agent. Upon receiving a commercial payment request, the customer agent initiates a transfer of electronic money from the money module.

U.S. Pat. No. 5,745,884 is directed to a system and method in which remote users may be billed, on a per connection basis, for universal data grade access to their home office servers. In this patent, a portable device is carried by a transient remote user within wireless range of an access point deployed, for example, at a hotel or airport lounge. A signaling system inside the portable device automatically initiates wireless contact with the access point which is itself connected to a destination server.

U.S. Pat. No. 5,732,400 is directed to a system and method for enabling on-line transactional services among sellers and buyers having no previous relationship with each other. The system includes a financial clearinghouse for receiving a request for goods or services from a buyer and making a real-time determination of a risk classification of the buyer using an on-line repository of credit information. The financial clearinghouse determines a risk-based discount fee as a function of the buyer's risk classification in order to establish a payment amount to the seller from the clearinghouse. If the transaction is authorized by the financial clearinghouse, the financial clearinghouse transmits the payment amount to the seller and transmits an invoice to the buyer for the purchase price of the transaction.

Over the last several years, much Internet activity has been focussed toward the individual needs of particular industry and market segments. Recently, so-called Internet portals have gained popularity. Portals provide focused information and user content to a wide variety of industries, interest group segments and market groups. An example of such a portal is TECHONLINE.COM, the website of the assignee of the present invention. This portal is directed to the needs of the technology and scientific communities.

Among the great needs within the technology community is that of providing remote end users with access to the electronic and computer components produced companies, such companies as Texas Instruments, for the purpose of testing and evaluation. Such companies as Texas Instruments, Analog Devices, Motorola, Intel, etc., provide so-called evaluation modules (EVM's) for components as well as compilers and debuggers which are provided to potential customers. Such test modules or EVM's and the software tools provide engineers, scientists and technicians with the opportunity to test and evaluate sophisticated electronic, software and computer equipment prior to its purchase. In particular, such modules permit such technology professionals to determine whether a particular piece of technology meets their needs and those of their companies prior to its purchase.

Unfortunately, heretofore, EVM's had to be individually produced and loaned out to potential customers for testing and evaluation. Such units were expensive and their physical distribution to potential end users was time consuming and slowed down the evaluation and testing process. Because this equipment is often fragile, it is not uncommon for it to break during testing or transportation between testing or evaluation sites. As with any object, theft or "shrinkage" is also a potential problem. Furthermore, a fully operational sales force might require a large number of EVMs for each product in its inventory, which could be an expensive undertaking for both the manufacturer and sales force.

There has been a long felt need for a system for proving evaluation modules (EVM's) and the development Software which could be centrally accessed via a global computer network and which would enable a multitude of engineers, technicians and scientists to test whether that particular component met their individual needs. Such a system would save substantial costs for component manufacturers, would expedite the sales and marketing cycle and would enable purchasers to make more rapid and informed purchasing decisions.

It would be particularly desirable to provide a system accessible via a global computer network whereby the EVM's and similar components from a plurality of manufacturers and the accompanying software could be selectively accessed and tested according to the individual needs of purchasers.

It is thus a principal object of the present invention to provide an evaluation module (EVM) and the development Software which can be accessed and utilized via a global computer network.

It is a further object of the present invention to provide an online system for facilitating access by end users to a boards such as an EVM and the corresponding developmental software.

It is a further object of the present invention to provide access to an EVM without the limitations associated with prior art systems.

These and other objects of the present invention and features of the present invention will become apparent from the following summary and detailed description.

SUMMARY OF THE INVENTION

In accordance with the present invention, a system for facilitating the access by a remote end user to components to be tested via a global computer network comprising: an interface for enabling an end user to access a central computer network in communication with components to be tested, said components to be tested residing on a second computer; means for interfacing the central computer network with the components to be tested on the second computer; means for enabling the end user to test the components to be tested on the second computer via the interface means and the central computer network; and means for transferring a result executed by the components on the second computer through the central computer network and to the end user.

In a further embodiment, the present invention comprises a system for facilitating the remote access and use by an end user to components and development tools to be tested via global computer network comprising: an end user interface for enabling an end user to access a central computer network in communication with components and div. Tools to be tested, said components to be tested residing on a second computer; means for interfacing the central computer network with the components to be tested on the second computer; means for enabling the end user to formulate and compile a test for the component on the second computer via the interface means to the central computer network; means for transferring the formulated and compiled software test for the component to the component on the second computer; and means for transferring the executed test by the component through the central computer network to the end user.

In a further embodiment, the present invention comprises a method for facilitating the remote access and use by an end user to components to be tested via global computer network comprising the following steps: providing an end user interface for enabling an end user to access a central computer network in communication with components to be tested, said component to be tested residing on a second computer; interfacing the central computer network with the component to be tested on the second computer; enabling the end user to formulate and compile test software for the component on the second computer via the interface means to the central computer network; transferring the formulated and compiled test for the component to the components on the second computer; and transferring the executed test by the components through the central computer network to the end user.

In still a further embodiment, the invention comprises a method for facilitating the remote access and use by an end user to an Evaluation Module to be tested via global computer network comprising the following steps: providing an end user interface for enabling an end user to access a central computer network in communication with an Evaluation Module to be tested, said Evaluation Module residing on a second computer; interfacing the central computer network with the Evaluation Module on the second computer; enabling the end user to formulate and compile code on which the Evaluation Module may perform a test function via an interface to the central computer network; transferring the formulated and compiled code for the Evaluation Module utilizing a file transfer protocol; and transferring the results of the executed test function by the Evaluation Module through the central computer network to the end user.

The present invention permits engineers, scientists and technicians to directly access real-time hardware and software products over a global computer network such as the Internet for evaluation and development. Users can upload their own code, compile, link, assemble and execute on actual remote hardware, and then debug, test and benchmark their own applications while remaining in their Internet browser.

The evaluation of third party hardware and software technologies and products is a key process in developing applications. The present invention harnesses the communication power of the Internet to streamline this vital evaluation and development process, saving time and costs both for the engineer and for the company offering the evaluated product. These and other objects and features of the present invention will become apparent from the detailed description which follows.

DETAILED DESCRIPTION OF THE FIGURES

FIGS. 4–8 illustrate user screens for use in the evaluation module access and testing system of the present invention.

DETAILED DESCRIPTION OF THE PREFERRED EMBODIMENT

The present invention is directed to a system for facilitating access by individuals to electronic software and hardware components, such as evaluation modules (EVM), for evaluation and testing via an online global computer network. In particular, the present invention is specifically designed and intended to provide access by individual end users to components such as EVM's via the Internet or World Wide Web using an end user interface.

Over the past fifteen (15) years, personal computers have become relatively powerful and inexpensive and have gained widespread use in a significant number of homes and businesses. With a modem, personal computers can communicate with other computers through communication networks and access many resources on the Internet. Companies such as America Online, CompuServe, and Prodigy, which traditionally provided so-called "content" over proprietary networks, have begun to provide access by personal computer users to an expansive international network of networks known as the Internet.

As is well known by those skilled in the art, the World Wide Web is built on the Internet. With common "Web Browser" software such as Mosaic, NetScape Navigator, or Microsoft Explorer, end users may easily access Internet information and services on the World Wide Web. A web browser handles the functions of locating and targeting information on the Internet and displaying information provided by the Web Server. The World Wide Web utilizes technology called "Hyper-Text" to organize, search and present information on the Internet. Using a browser, the end user can select a word ("Hyper-Text word") from a view document and be linked to another document featuring information related to the word.

Figure 1:
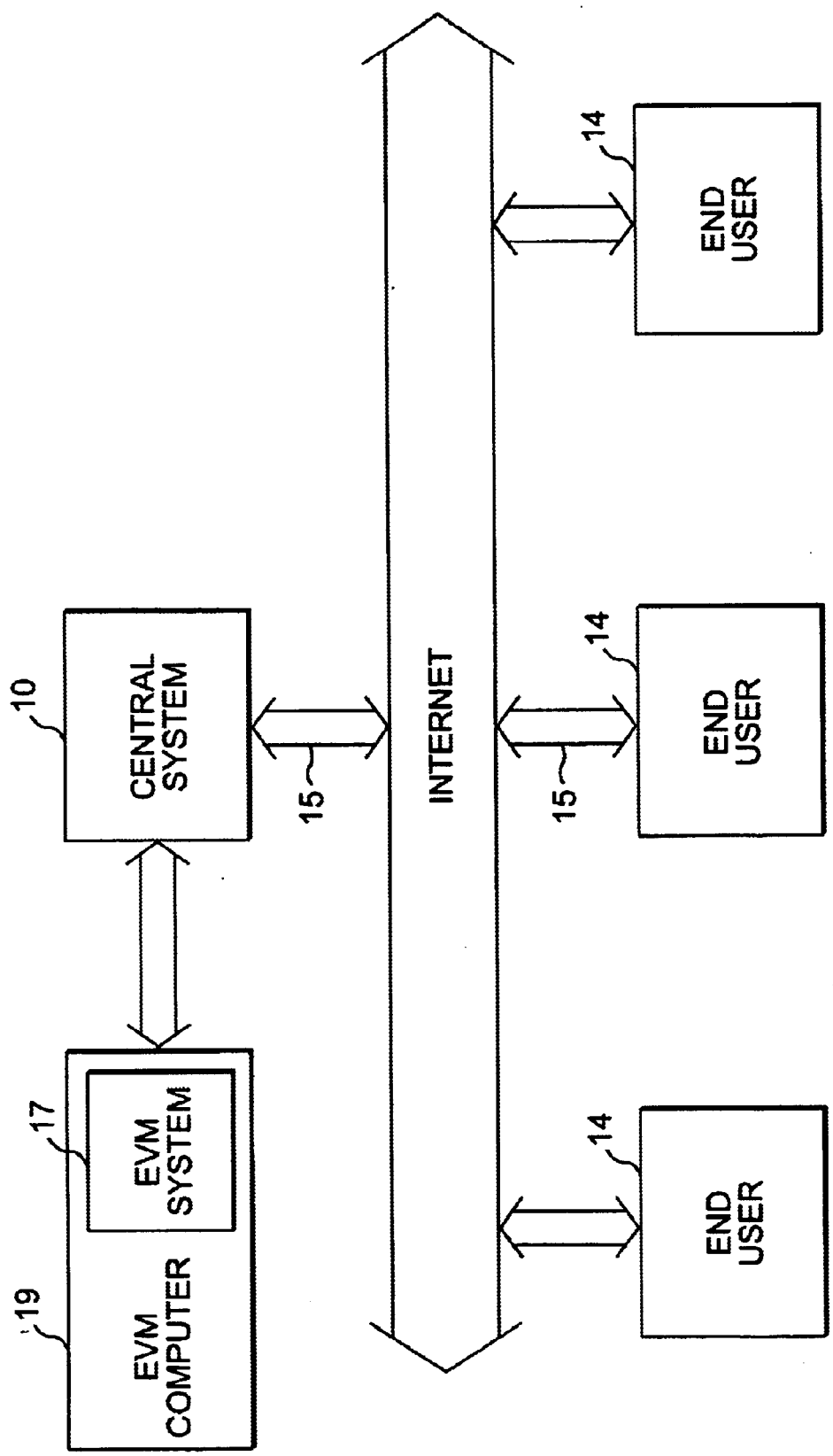
FIG. 1 is block diagram of the of the present invention.

Referring to the attached Figures, and in the context of the above operational environment, the present invention is now more fully described. As shown in FIG. 1 the present invention is broadly directed to a computer network for facilitating access by third parties to software, electronic and computer components such as EVM's. For the purposes of this invention, the term component also encompasses software, such as, but not limited to developmental software. The present invention is designed, in one embodiment, to be utilized on the World Wide Web or Internet, although the present invention is equally applicable to other network environments. In a broadest embodiment, the present invention is directed to system for allowing end users to access and test a component such as EVM via any global network.

In a most preferred embodiment, the invention initially comprises a central server 10 and a plurality of end user work stations 14. In one embodiment, the end users 14 may comprise individual users such as engineers and scientists who desire to access and use the system. A transport medium 15, in one embodiment using Internet Protocols (IP), interfaces the end users 14 to the central server 10. Central server 10 accesses a test component 17, including but not limited to an EVM, which is under the control of a second computer 19. Second computer 19 may operate under a DOS or Windows environment. The central server system 10 may comprise a Windows NT system, but is preferably a server such as the Sun Microsystems Solaris 2.6 server (hereinafter the "SUN" or "SUN System").

Figure 1A:
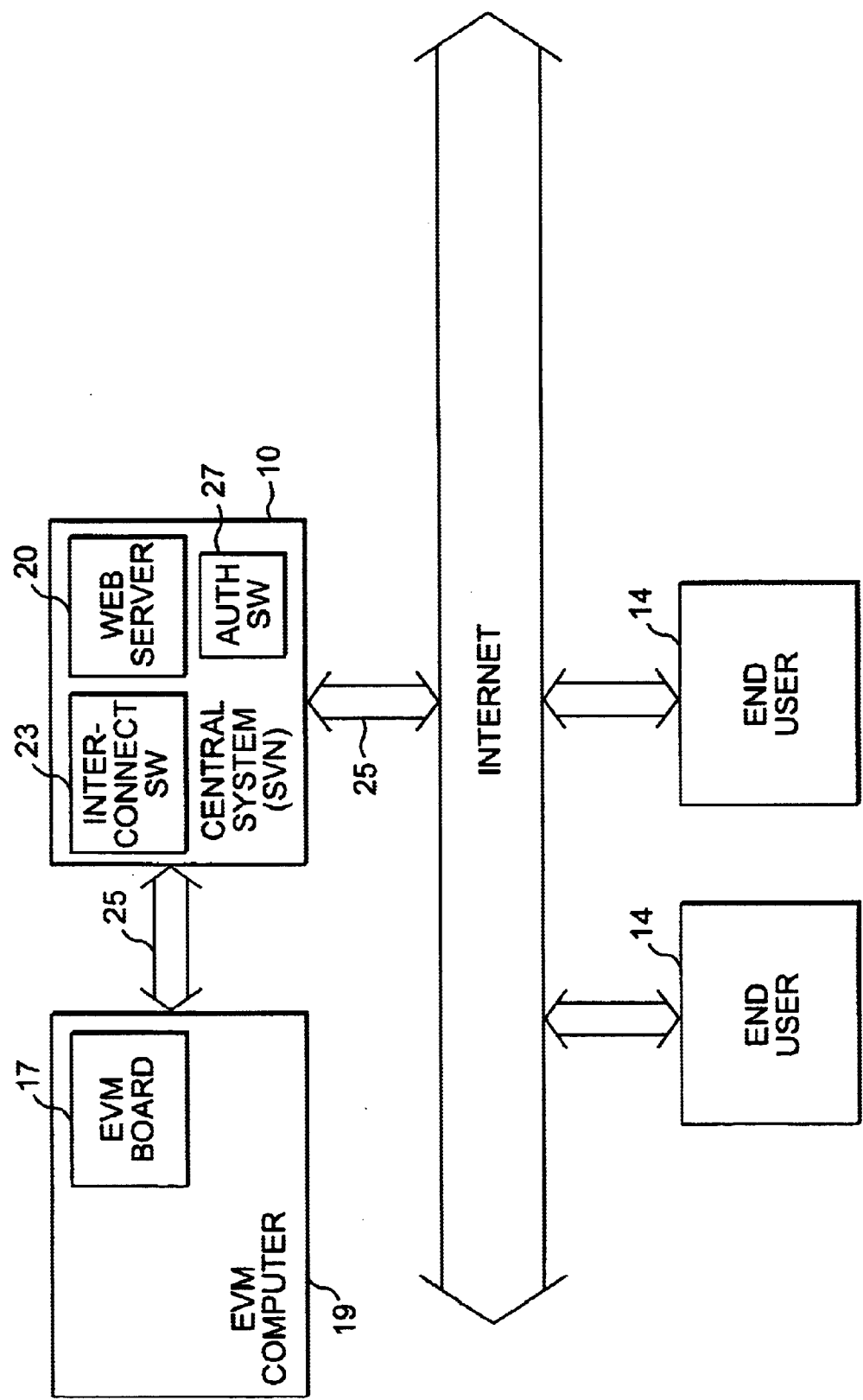
FIG. 1A is a more detailed block diagram of the present invention.

As shown in FIG. 1A, a more preferred embodiment of the present invention is shown in detail. This embodiment comprises the following most preferred components. Initially, the central system 10 includes a Web Server 20, preferably under the control of the SUN system 10 which has the capabilities to produce dynamic output either as Perl, Java scripts or other executables. Secondly, the EVM computer 19 contains an EVM board 17 which runs programs such as debugger programs to be accessed by third party end users 14. The EVM computer 19 uses a compiler program capable of running the compiler provided by the EVM manufacturer. The system further includes interconnection software 23 including FTP servers and clients. Telnet servers and clients and HTML servers which control communication between system 10 and 19. The system further includes network hardware 25, i.e., the hubs and cables required to connect the computers to the Internet. Finally, the system includes authentication software 27 for facilitating the identification of end users and the configuration of passwords within the computers of the system.

The end user workstations 14 may comprise any device that connects to the system via the Internet or other IP transport methods and includes, but is not limited to, such devices as televisions, computers, hand-held electronic devices, wireless electronic devices, or any other device that uses IP's and uses a transport medium. Non-limiting examples of an acceptable transport medium 15 for use in the present invention include any link such as an ATM link, FDDI link, satellite link, cable, twisted pair, fiber-optic, broadcast wireless network, the Internet, the World Wide Web, Local Area Network (LAN), Wide Area Network (WAN), or intranet environment such as an Ethernet link. In such alternative cases, the end user workstations 14 communicate with the central server 10 using protocols appropriate for the network to which that client is attached. All such embodiments and equivalents thereof are intended to be within the scope of the present invention.

Thus, it can be seen from the preferred embodiment of FIGS. 1 and 1A, that the system as a whole is comprised of a number of end user devices 14 that communicate with the central server 10 and component to be tested such as EVM board 19 residing on a second computer 19 through a transport medium 15 preferably using an appropriate protocol.

Figure 2:
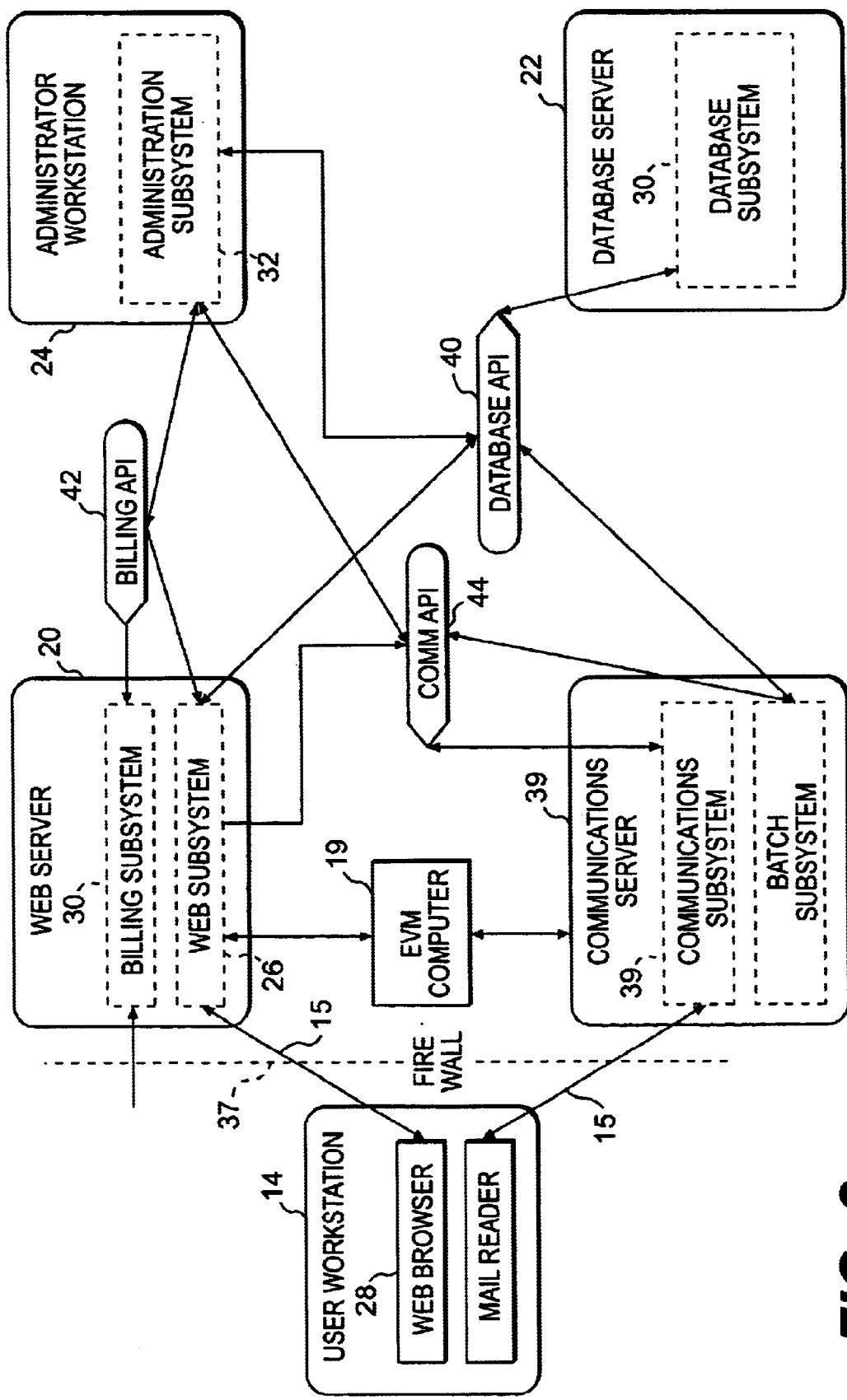
FIG. 2 is a block diagram of a central server system of the present invention.

Referring to FIG. 2, a detailed block diagram of a preferred embodiment of a central server and system 10 for use with the present invention is shown. The central server 10, preferably operates under SUN operating system such as Solaris 2.6, but could operate under a Windows NT system or any other operating system. It is to be stressed that the nature of the operationing system is not essential to the invention and that the invention is not limited to particular operating systems. System 10 includes two primary servers, Web Server 20 and Database Server 22. The Database Server 22, in one embodiment, may utilize "SQL Server" database management software from Microsoft Corporation, but more preferably comprises a package such as the Oracle 8 database management system produced and sold by Oracle Corporation. The Database Server 22 couples to a Database Subsystem 30.

The Web Server 20 includes a Web Subsystem 26 which connects to a Web Browser 28 situated in the end user stations 14. Apache 1.3.1 by Apache Group is an exemplary Web Server 20 software package for use in the present invention. Apache 1.3.1 includes a high performance web server, an application development environment, integrated full-text searching, multimedia streaming, and site management tools. This package also includes support for HTTP, Java and Telnet compatible browsers to begin receiving data from any part of a file for enhanced performance.

As noted, in a preferred embodiment, the Web Server 20 comprises the Apache 1.3.1 operating under the SUN Solaris 2.6. The central system 10 further includes up to 256 MB of ECC RAM, a graphics adapter capable of displaying 1024× 768 pixels with a depth of 8 bits, a 15 inch monitor, a PCI Fast/Vide SCSI-2 I/O adapter, one PCI 10base2 Ethernet adapter and one PCI 100baseT Ethernet adapter, a keyboard and a mouse.

The central server and system 10 also preferably includes an Administrator Workstation 24 that provides administrative capabilities for the entire system. The Administrator Workstation 24 permits administrators or other operators of the system to perform routine operations to effect the system. Such operations may include, but are not limited to adding subscribers and users, adding, deleting or editing records, printing reports, updating records, performing backups, and maintaining the programs that comprise the system.

The Administrator Workstation 24 is able to communicate directly with the Web Server 20 and the Database Server 22. The Web Server 20 sends retrieval or post event information as HTML (Hyper-Text Mark-up Language), Java of applet through the Web Subsystem 26 to a Web Browser 28 software program based within the end user workstations 14 responsive database queries input by the end users 14. The Database Server 22 operates in concert with the Web Server 20 and maintains all the end users' account information, profile financial records, and other associated transaction data as well as all interactions with the Web Server 20.The Web Subsystem 26 performs all interactions with the Web Browser 28 in the end user device 14, and serves as the end user interface to the system.

All of the systems described above preferably communicate, for example, via an Ethernet 100BaseT network and a Switching Hub. In addition, a second, isolated, network segment may exist between the Web Server 20 and the external communications hardware (Internet router), which keeps external traffic isolated from the internal network, as well as providing a dedicated connection between the Web Server 20 and the Internet for maximum throughput.

As noted above, Web Server 20 is the point of entry to the system. It determines the identify of the end user 14. The Web Server 20 sends information to the end user workstation 14, validates end user passwords, sends logging and transaction information to the Database Server 22, and performs logical operations, thereby also behaving as a transactional server.

The operators and managers of the system may selectively create and delete information by utilizing the Administration Subsystem 32 housed in Administration Workstation 24. Billing Subsystem 36 is responsible for system billing.

The Database Subsystem 30 resides in the Database Server 22. Communication and Billing Subsystems 39,36, respectively, execute essential services for other parts of the system, and have well defined application program interfaces (API). The system is preferably protected for the Internet by a firewall 37.

Figure 3:
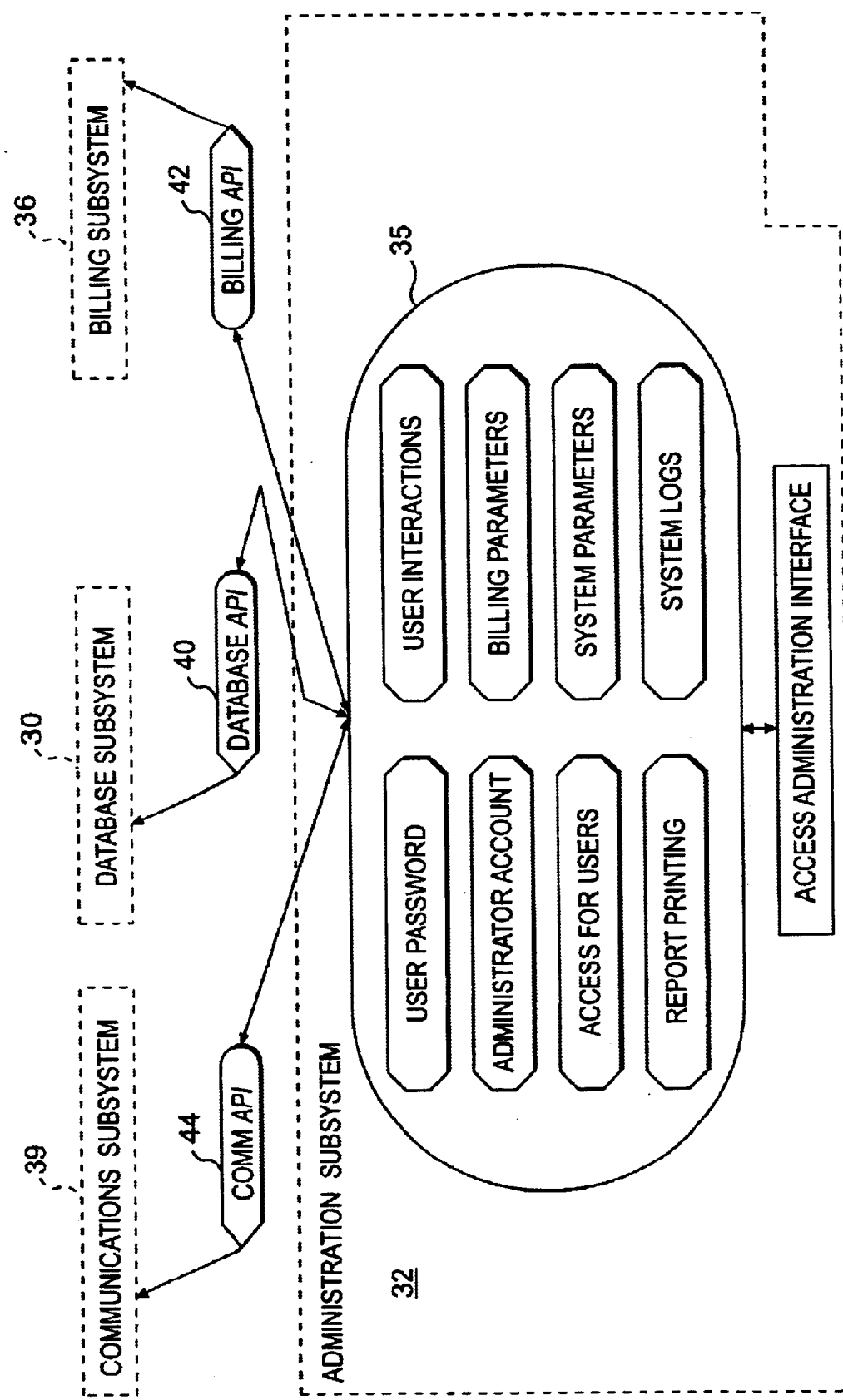
FIG. 3 is a block diagram of the administrative work station of the present invention.

Referring now to FIG. 3, an Administration Subsystem 32 is shown in greater detail. Administration Subsystem 32 provides an interface for operators and managers of the system to modify at the Database Subsystem 30, print reports, view system data, and log user comments and complaints. The Administration Subsystem 32 provides a collection 35 of access forms, queries, reports, and modules to implement the administration interface. The Administration Subsystem 32 interacts with Communications 39, Database 30, and Billing 36 Subsystems.

Figure 3A:
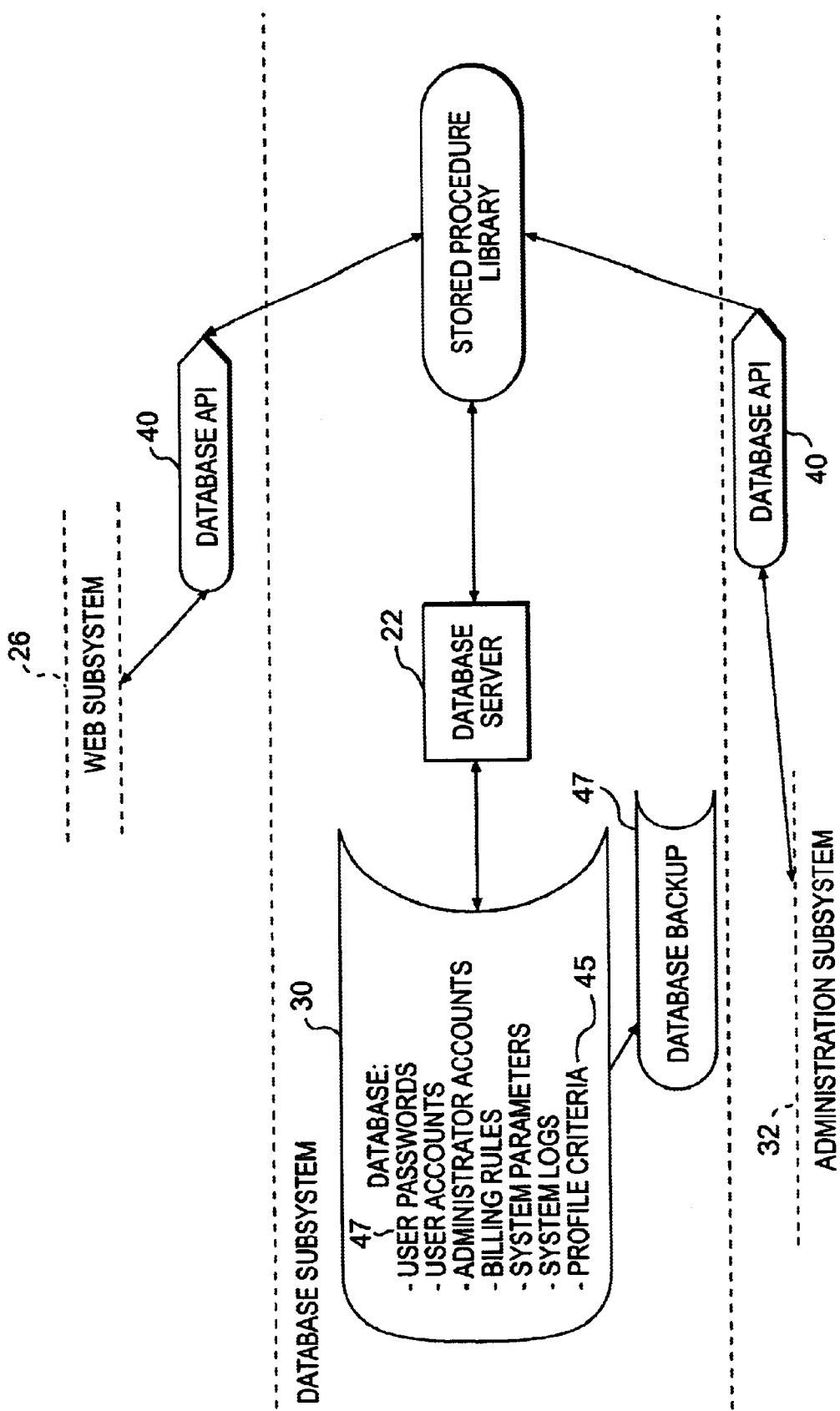
FIG. 3A is a block diagram of the database server and subsystem of the present invention.

Referring to FIG. 3A, the Database Subsystem 30 stores information pertaining to users, administrator accounts, as well as the stored end user profile criteria 45. All interactions with the Database Subsystem 30 are performed through a Database API 40. The Database Subsystem 30 is preferably implemented using the Database Server 22, and will be backed up on a regular basis 47.

Communications Subsystem 39 interfaces to a Comm API 44 and functions to transmit credit data and events to end users 14. The Billing Subsystem 36 is used for billing and communicates through the Billing API 42 to the Administration Subsystem 32. As noted above, billing can be accommodated in the, present invention at the local server 12.

Database Server 22 implements the Database Subsystem 30 of the present invention. Through the Database Subsystem 30, the Database Server 22 logs client setup and account creation information, member profiles 45 and posted opportunities 47 event information and files, maintains account balances, produces and prints reports, hosts backup operations, and performs statistical calculations for the entire system. The Database Server 22, preferably using Oracle 8, which provides virtually unlimited scale ability and is compatible with the SUN 20. The Database Server 22 is preferably a dual processor computer and includes a processor, and is preferably optimized specifically for the Oracle 8 threading model. Each connection to the Database Subsystem 22 may be handled by a separate thread within the Database Server 22. Database Server 22 may require additional processors in high volume environments. The dual processor machine of the preferred embodiment is sufficient for the type and number of transactions that it will be performing. It is to be noted that the Database Server 22 can be "striped" to two or more machines to distribute the server load.

As noted above, in the preferred embodiment, at least one Administration Workstation 24 is provided for administering the system. It is to be appreciated that additional operator workstations 24 may be added with extra computer systems, installing the administration software and connecting them to the LAN.

The operation of the present invention is now described in detail with reference to the attached Figures, including. FIGS. 4–8 and the attached Appendices which illustrate and detail operational embodiments of the present invention. Initially, the end user at workstation 14 uses his Web Browser 28 to access the central server 10. In an Internet environment, this will typically comprise a central web page such as the home page of TECHONLINE.COM, site of the assignee of the present invention. In one embodiment, the present invention allows engineers, scientists and technicians to access products such as compilers, debuggers and linkers and to load code to hardware evaluation modules such as the TI TMS320C3X and the TI TMS320C54X.

As will be discussed herein, the use of the present invention benefits greatly from the application of the JavaJ programing language to develop universal Internet Applets. The Applets are cross platform, and do not require the user to configure his browser. The development of the Applets enables the customization of a Graphic User Interface (GUI) for each specific EVM and adds features which enhance product evaluations, such as interactive help files, mouse control, and other capabilities. In those cases in which a product cannot be evaluated on-line because of bandwidth constraints, a virtual demo model can be designed using the Java language, web pages written in HTML with GIF images, and streaming video to give the user the look and feel of a genuine product.

In general, the use of the present invention is more fully described as follows. Initially, the end user 14 accesses a welcome page by linking through other pages or by directly accessing the URL for the site of the central server 10. As shown in FIG. 4, a first page introduces the user to the system and its benefits. General instructions 50 are provided and user options are set out. Users will generally be able to select from a plurality of EVM's and proceed to individual EVM's provided by the system.

For purposes of describing the present invention, exemplary EVM's accessible from the system include the Texas Instruments' TMS320C3x52 and TMS320C54x family of compilers, debuggers, linkers and hardware evaluation modules. It is anticipated that a multitude of other EVM's will be available through the present invention. In the example discussed herein, the EVM's, supplied by Texas Instruments, comprise computer add-on cards that can be used in computer 19 which runs on Microsoft Windows 3.1 or MS-DOS as an operating system. The debugger used with the EVM's requires a minimum of a DOS operating system, but preferably reside on a machine under the control of a Windows operating system. The descriptions below are generalized to describe both families of currently available evaluation modules (EVMs).

As shown in FIG. 4, the end user 14 chooses from a plurality of available options for the particular EVM. The options for the Texas Instrument's family of EVMs include the option of remotely compiling sample C code 54, compiling custom user supplied C code 56 or of directly access the EVMs 58. The homepage also contain a suggested sequence of steps. These include to first compile the code, download the code onto the EVM machine and then to access the EVM.

The options for accessing the EVMs will in a preferred embodiment, further include both text and audio help 60. For text assistance, two separate windows appear, a help window and an access window. The text help window contains instructions and a troubleshooting link. The troubleshooting link connects to a FAQ (Frequently Asked Questions) page 62. The access window comprises a telnet window implemented as a Java applet. This window contains a bar on the left-hand side with URL links to the text of help steps. When chosen, the help text will also appear in the text help window. A window is provided for audio help which contains the Java telnet window, the left-hand bar and link for audio help. The audio help may be heard by the Internet user only with the aid of an audio RealAudio(tm) player.

Referring to FIG. 5, it is assumed that the end user 14 has chosen to compile sample code. The options to configure the compiler and linker are then presented. These options include viewing the assembly code 64, linking the code to make a load module 66 and viewing the size of the load module 68. The end user 14 may use any option by clicking on a check box with his mouse. This part of the system provides compiler and linker help 70. As shown in FIG. 6, after compiling the code, the end user gets results and can then access the EVM and recompile code. The user loads the resultant files of the compiler into the debugger by clicking to access the EVM.

Figure 6A:
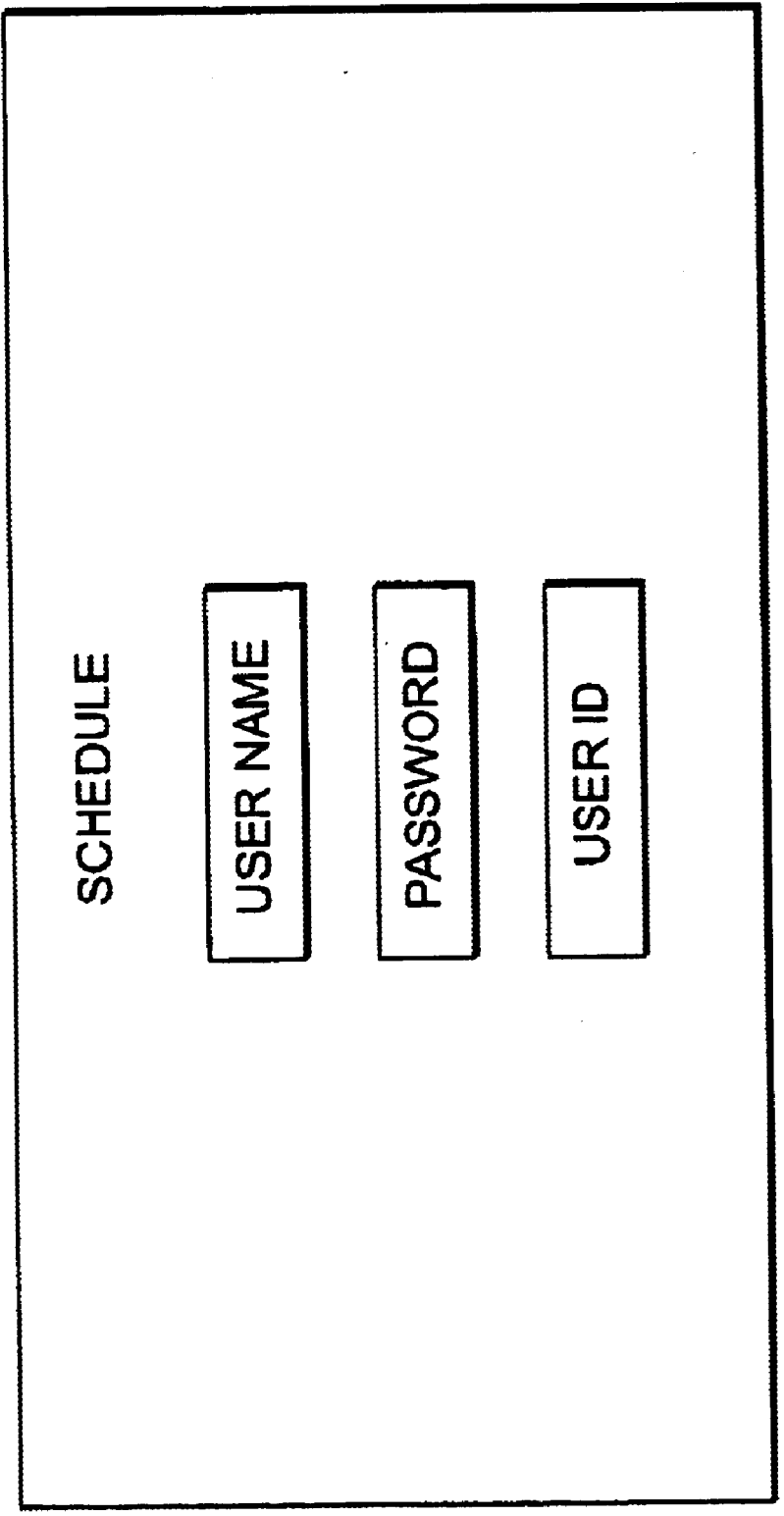

As shown in FIG. 6A, the present invention further incorporates a scheduling program that permits and/or restricts access to the EVM. This can be used to allow dedicated hardware and software to be accessed by prospects and customers. The scheduling system allows end user to reserve one-hour time slots up to two days in advance. A four-digit identification code is given to the end user when the reservation is made. As shown in FIG. 7, the user then accesses the EVM that has been reserved by entering the identification code 72.

The compiler tools for the EVM's operate under the SUN Solaris 2.6. The integration between the Sun and Windows 3.1 on computer systems 19 is now described. All output that is generated from any scripts, programs or other executables on any machine or platform must be served to the client through the Web Server 20 while maintaining security and authentication.

The present invention generally performs the following method steps: First, it displays an introduction to the end user. Second, it lets the end user remotely compile and debug the C code using the EVM's native compiler. It then transfers the resulting object files and code to the EVM machine. The user is then connected to an EVM machine to execute the debugger. FIG. 8 illustrates a list of commands which the end user 14 may utilize while testing the EVM.

Web pages (HTML, HTM, CGI output, etc.) are served to the end user 14 to display the introduction and to guide the user through the system. As noted above, the SUN server 10 is used for compiling C code and as a Web Server. Obtaining user supplied C code and compiling is performed on the SUN 10 using a number of CGI scripts written in both Perl or Unix shell and HTML.

Once a successful compilation of C code has been accomplished, the resulting code and programs are transferred to the EVM computer 19 with EVM board 17 so that, for example, the EVM debugger can be accessed and used. In a preferred embodiment, FTP protocol is used to effectuate this transfer. This transfer requires that the computer 19 be running an FTP server (or daemon).

The user will choose through his Web Browser 28 to execute a CGI script that will transfer his files to the EVM. The FTP server being used on the EVMs is produced by FTP Software which is capable on running on the Windows 3.1 environment of EVM computer 19, and which is required by the EVM debugger.

After the transfer of files, the end user is then connected to the EVM 19. Using either a Java application that can run in the user's web browser or through a telnet client, a telnet session is created under the control of the SUN 10. As noted above in FIG. 6A, the end user is required to authenticate using a predetermined username and password. This requires that UNIX accounts have been set up on the SUN. Depending on the username given, the account's profile is executed. This profile is a UNIX shell script that is automatically executed upon successful login.

A telnet connection is then automatically made to the selected EVM, which preferably runs Everywhere Access Telnet Daemon, Version 3.00c. The Telnet daemon on the EVM is configured to automatically launch the EVM debugger upon successful connection. Once the debugger session is terminated, the telnet connection from the SUN 20 to the EVM is automatically terminated, which then, in turn, terminates the connection between the user and the SUN.

As noted above, the system 10 keeps track of the code being compiled and downloaded to each EVM and reserves scheduling time.

The following discussion and attached Appendices set forth in greater detail the precise operation of the web pages and scripts used to effectuate the present invention. The specific HTML pages, CGI scripts and programs used to connect a user to a TMS320C3x EVM (with audio help) are specifically set forth below.

http://www.dsplab.com/dsplab_new/ http://www.dsplab.com/ti/tol/c3x/c3x_home.html http://www.dsplab.com/cgi-bin/t-c3x_compile (or http://www.dsplab.com/cgi-bin/t-c3x_compile_user_code for user code)

http://www.dsplab.com/cgi-bin/cmplnkexx.pl (or http://www.dsplab.com/cgi-bin/cmplnkexx.pl/user for user code)

http://www.dsplab.com/cgi-wsti/xfercodex.pl//export/home/tmp/$$

http://www.dsplab.com/ti/c3x_telnets.html

The home page is the initial starting point of the system. As noted above, the end user 14 may choose an EVM such as either the C3x or C54x EVM. The home page for each respective EVM contains the choices to compile sample code, compile custom code or to directly access the EVMs. The display of the next page depends on the user's selection. Either the currently available sample code is displayed or a form for entering new code is displayed. This is accomplished using the t-cXx_compile and t-cXx_compile_user_code Perl scripts, where cXx indicates either c3x or c54x. To compile sample code, the t-cXx_compile script is used. Otherwise, the t-cXx_compile_user_code script is used to compile the given C code. Set for below is an outline of how each script functions.

The t-c3x_compiles script (written in Perl) opens the sample code, function.c in the directory /code and includes it in the printed HTML page presented to the end user. The HTML page contains a form, which executes cmplnkexx.pl when the form is submitted. Appendix A sets for the perl code for t-c3x compiles.

The t-c3x_compile_user_code script (written in Perl) displays the form needed to input custom source code and the name for the code; the html page contains a form, which executes cmplnkexx.pl (Perl) when the form is submitted. Appendix B sets forth the code for t-c3x_compile_user_code.

Both forms call the cmplnkexx.pl script, shown at Appendix C, but each have different parameters. A tag is put into the URL by the compile script above if the user is supplying code. If that is the case, the user-supplied name is attached to the code that is to be compiled, otherwise it is named function.c.

The Cmplnkexx.pl script (written in Perl) first parses its input to determine if the code is user supplied or if it is the sample code. Code supplied by the user is saved locally on a disk. If the code being used is the sample code, then that is written to a temporary file on a disk in a staging directory. The saved code is then compiled according to the options that were supplied by the user. The tools are on the SUN in the directory /tools_dir. The compiling and linking is done on the SUN. Once compiled, the output files are stored in a staging directory, /export/home/tmp/$$, where the $$ refers to a Perl construct and is used as an identifier. The identifier is generally a 3 or 4 digit code.

The next script to be run is http://www.dsplab.com/cgi-wsti/xfercodex.pl//export/home/tmp/$$, as shown in Appendix D. XFercode.pl (Perl) transfers the output files in the staging directory via FTP to the appropriate EVM, in this example, to EVM1. Once the transfer is complete, the Gateway page (FIG. 7) is printed and displayed to the user. The gateway page contains step-by-step instructions on how to proceed through the gateway, an EVM command summary for the debugging tool and the actual links to connect to the EVMs with either audio or text help.

The connection link to the C3x EVM with audio help is located at http://www.dsplab.com/ti/c3x_telnets.html. At this address links for audio help steps are shown. The Telnet applet implemented in Java is loaded and is directed to make a connection with www.dsplab.com. Once connected, the user is instructed to log into the appropriate EVM. If no password is provided, the Java Telnet client supplies a "Disconnect" button for quick disconnection.

The .profile (UNIX shell) of the EVM account on the SUN is designed to automatically connect to the appropriate Windows 3.1 client and commence a debugging session using the tools discussed above. Once the debugging session ends, the connections to the EVM are broken and the user is disconnected.

As noted, the EVM 19 is isolated from the rest of the Internet by the SUN system 10. This allows the SUN 10 to perform the necessary authentication, effectively leaving the EVM computers as "dumb devices." By isolating the EVM's, any security break-ins must occur through the SUN. The SUN Solaris operating system can be configured to be a much more secure operating system or other environments.

The individual EVM debuggers include a Telnet daemon and FTP daemon running simultaneously. In a preferred embodiment, these daemons may be commercially available from FTP Software and Everywhere Access, respectively. A Cron (or clock) daemon periodically executes two programs that monitor the EVM machine for resets and, re-synchronize the clock with the SUN server 10.

An exemplary cron daemon for use in the present invention may be that of Software Engineering, Inc. The system preferably further includes both SyncTime and EVMReset programs. The SyncTime program queries the SUN server for the correct time and resets the computer 19 time to that provided by the SUN 10. This is required because the time on the EVM computers may stray. THE EVMReset program monitors for a flag that indicates that the EVM computer 19 has hung (i.e. become non-responsive) and resets the computer. The EVM can become non-responsive if any of the connections between it and the SUN or the SUN and the end user abruptly terminate. This can result from to network congestion, network breaks, or failed execution of scripts and programs.

The FTP daemon polls for the connections that xfercode.pl makes to the EVM. When the connection is made, the files of the end user 14 are transferred and the connection is closed. The Telnet daemon is then used once the user has logged into the SUN. The end user logs into the SUN and the profile for the particular selected EVM is executed. The profile then makes a Telnet connection with the EVM. The Telnet daemon on the EVM machine 19 is configured to automatically execute the debugger. Once the debugger session ends, the daemon terminates the Telnet connection with the SUN server 20. The SUN server 20 then terminates the login of the user.

The example discussed above utilizes the C3x. The set-up for the C54x or other EVM's is identical. Scripts specific to the appropriate evaluation board being used are labeled as such (i.e., t-c3x_compile vs. t-c54x_compile). There are additional scripts that perform cleanup operations, usually hourly. These include evm_management.pl (Perl) and ws_management.pl (Perl). They perform the functions in an elaborate scheme of recording processes, monitoring and scheduling session activity, and setting flags for the EVMs to reboot and cleanup.

The present invention has been described with reference to the above detailed description. The true nature and scope of the present invention is to be determined with reference to the attached claims.

APPENDIX

The following programs are the copyright of Techonline, Inc., 1999. All rights reserved.

---

Directory and File listings
    /etc/httpd.conf B looks like the conf file for the server
HTTPD Version:
    $ ./httpd Bv         **** in /usr/sbin
    Server version: Apache/1.3.1 (Unix)

-continued

```
    Server built: Jul 23 1998 15:53:57
    /code54x B holds sample code and code to be compiled by users
    /cl30 B header files for the c3x compiler
    /tools54x_dir B c54x compiler, linker and other tools
    /tools_dir B c3x compiler, linker and other tools
    /www/bin - random web server administration utility scripts and binaries ( expire,
htadm, etc)
    /www/cgi-bin - CGI scripts that handle the compilation of the VirtuaLab and scheduling
and such
    /www/cgi-prv2 B random scnpts; includes a Y./ws directory that has a bunch of scripts
in it; development purposes
    /www/etc B a couple of scripts and password files for authentication
    /www/log B contains the evm transfer log
    /home2/apachewww -- build directory for the Apache web server
    /home2/cernwww -- build directory for the Cern web server
    /home2/evm1 -- TI C3x EVM account
    /home2/evm2 -- TI C3x EVM account (defunct)
    /home2/evm3 -- TI c54x EVM account
    /home2/evm4 -- TI c54x EVM account (defunct)
    /home2/evm5 -- Marshall EVM account
    /home2/titools -- archive for sample code
    /home2/www B Root directory for the Apache Web Server -- where all the files are,
including the Java classes and the html
    /home2/www/ti/tol/cXxx B where the html pages lie for each evm board type
    /home2/www/dsplab_new B the new welcome page
```

APPENDIX A

Code
t-c3x_compile

```
        t-c3x_compile (written in Perl): opens the sample code, function.cin the directory
/code and includes it in the printed html page presented to the user; the html page
contains a form, which executes cmplnkexx.pl when the form is submitted
        #!/usr/bin/perl
        # Script to display page of sample C code and options for compiling.
        # John Irza, 2/20/96
        $codedir="/code";
        $codefile = "function.c";
        chdir($codedir);
        print "Content-type: text/html\n\n"
        print "<TITLE>Compile Sample Code</TITLE>\n";
        print "<H1>Compiling Sample Code for EVM</H1>\n"
        print "Here is the sample code which you will now compile:<br>";
        print "<HR>"
        print "<pre>";
        open( SAMPLECODE,$codefile) || die "Can't open sample code file $codefile\n";
        while( <SAMPLECODE>) {
    s/</< / if (/<./);
    print $_;
    }
        print "</pre>";
        print "<HR>"
        print "Please select any of the following options:<br>";
        print "<FORM ACTION=\"/cgi-bin/cmplnkexx.pl\" METHOD=POST>";
        print "<DT>";
        print "<DD>";
        print "<INPUT TYPE=\"check box\" NAME=\"vasm\" VALUE=\"yes\" > View
Assembly Code";
        print "</DD>";
        print "<DD>";
        print "<INPUT TYPE=\"check box\" NAME=\"vinter\" VALUE=\"yes\" > View
Interlist of Source & Assembly Code";
        print "</DD>";
        print "<DD>";
        print "<INPUT TYPE=\"check box\" NAME=\"vsizobj\" VALUE=\"yes\" > View Size
of Object Code";
        print "</DD>";
        print "<DD>";
        print "<INPUT TYPE=\"check box\" NAME=\"link\" VALUE=\"yes\"> Link Code
To Make Load Module";
        print "</DD>";
        print "<DD>";
        print "<INPUT TYPE=\"check box\" NAME=\"linklib\" VALUE=\"yes\" > Include
```

APPENDIX A-continued

```perl
Run-Time Support Library";
        print "</DD>";
        print "<DD>";
        print "<INPUT TYPE=\"check box\" NAME=\"vsizout\" VALUE=\"yes\" > View
Size of Load Module (after linking)";
        print "</DD>";
        print "<P>";
        print "Click <A HREF=\"/ti/arglist.html\">here</A> to see a complete ";
        print "list of compiler and linker options.\n";
        print "<HR>";
        print "<INPUT TYPE=\"submit\" VALUE=\"Compile Code\">";
        print "<INPUT TYPE=\"reset\" VALUE=\"Clear Form\">";
        print "</FORM>";
```

APPENDIX B t-c3x compile_user_code

```perl
        t-c3x_compile_user_code (Perl): displays the form needed to input custom
source code and the name for the code; the html page contains a form, which executes
cmplnkexx.pl when the form is submitted
        #!/usr/bin/perl
        # Script to accept user's sample C code and options for compiling.
        # John Irza, 2/20/96
        #
        $codedir="/code";
        $codefile = "function.c";
        chdir($codedir);
        $charlimit = 32000; # Character limit of pasted-in user code.
        print "Content-type: text html\n\n";
        print "<TITLE>Compile User Code for EVM</TITLE>\n";
        print "<H1>Compiling User Code for EVM</H1>\n";
        print "<FORM ACTION=\"/cgi-bin/cmplnkexx.pl/user\" METHOD=POST>";
        print "Please enter a name for your source code and output file (up to 8
characters).<br>";
        print "We'll add the '.c' suffix for you: <INPUT NAME=\"usercodename\"
SIZE=41 >.c<BR>";
        print "<HR>";
        print "Now paste in your source code:<br>";
        print "<TEXTAREA NAME=\"usersourcecode\" ROWS=25 COLS=60>";
        print "</TEXTAREA>";
        print "<HR>";
        print "Please select any of the following options:<br>";
        print "<DT>";
        print "<DD>";
        print "<INPUT TYPE=\"check box\" NAME=\"vasm\" VALUE=\"yes\" > View
Assembly Code";
        print "</DD>";
        print "<DD>";
        print "<INPUT TYPE=\"check box\" NAME=\"vinter\" VALUE=\"yes\" > View
Interlist of Source & Assembly Code";
        print "</DD>";
        print "<DD>";
        print "<INPUT TYPE=\"check box\" NAME=\"vsizobj\" VALUE=\"yes\" > View Size
of Object Code";
        print "</DD>";
        print "<DD>";
        print "<INPUT TYPE=\"check box\" NAME=\"link\" VALUE=\"yes\" > Link Code
To Make Load Module";
        print "</DD>";
        print "<DD>";
        print "<INPUT TYPE=\"check box\" NAME=\"linklib\" VALUE=\"yes\" > Include
Run-Time Support Library";
        print "</DD>";
        print "<DD>";
        print "<INPUT TYPE=\"check box\" NAME=\"vsizout\" VALUE=\"yes\" > View
Size of Load Module (after linking)";
        print "</DD>";
        print "<HR>";
        print "<INPUT TYPE=\"submit\" VALUE=\"Compile Code\">";
        print "<INPUT TYPE=\"reset\"VALUE=\"Clear Form\">";
        print "</FORM>";
```

APPENDIX C cmplnkexx.pl cmplnkexx.pl first parses its input to determine if the code is user supplied or if it is the sample code. Code supplied by the user is saved locally on disk. If the code being used is the sample code, then that is written to a temporary file on disk. The saved code is then compiled according to the options that were supplied by the user. The tools are on the SUN in the directory /tools_dir. The compiling and linking is done on the SUN. Once compiled, the output files are stored in a staging directory, /export/home/tmp/$$, where the $$ refers to a Perl construct and is used as an identifier. The identifier is generally a 3 or 4 digit code.

```perl
#!/bin/perl
# set env variables for ti tools
$oldpath = $ENV{"PATH"}; # Save previous path.
$ENV{"PATH"}= "/bin:/usr/bin:/tools_dir";
###$ENV{"TMP"}= "/tools_dir";
$lengthlimit = 32000; # Character limit for user-supplied code.
$webmaster = "admin\@dspnet.com";
$ftpdir = "/export/home/ftp/pub/evm";
$debug = 0;
# Extract any options to script invocation.
$option=$ENV{"PATH_INFO"};
$option=~s/V//;
$toolsdir = "/tools_dir";
$codedir="/tools_dir";
$tmpdir = "/tmp";
    print "Content-type: text/html\n\n";
    print "<HTML>\n";
    print "<HEAD>\n";
    print "<TITLE>Compile/Link Results</TITLE>\n";
    print "</HEAD>\n";
    print "<BODY>\n";
    print "<H1>Compile/Link Results</H1>\n";
if ($ENV{'REQUEST_METHOD'}eq 'POST') {
            # Get the input
    read(STDIN, $buffer, $ENV{'CONTENT_LENGTH'});
            # Split the name-value pairs
    @pairs = split(/&/, $buffer);
            # Load the FORM variables
    foreach $pair(@pairs) {
        ($name, $value) =split(/=/, $pair);
        $value =~ tr/+/ /;
        $value =~ s/%([a-fA-F0-9][a-fA-F0-9])/pack("C", hex($1))/eg;
        $FORM{$name}= $value;
    }
    # handle script options first
    if( $option =~ /user/) { # we're processing user-supplied code
        if ( length( $FORM{usercodename}) == 0 ) {
            $FORM{usercodename}= "temp";
        }
        $basecodename = $FORM{usercodename};
    }
     else {
        $basecodename = "function";
    }
    $origname = $basecodename;
    $basecodename = $basecodename . $$;
    $sourcecode = $basecodename . ".c";
    $outfilename = $basecodename . ".out";
    # write user or example code to temp source file.
    chdir($codedir) || die "cannot chdir to directory $codedir";
    open(SOURCECODE,">$sourcecode") || die "cannot open $sourcecode for writing\n";
    $userlength = 0;
    if( $option eq "user" ) {# we're processing user-supplied code
        print SOURCECODE "$FORM{usersourcecode}\n";
        $userlength = length( $FORM{usersourcecode});
    }elsif ( $option eq "userftp") {# we're processing user/ftp-supplied code
        $ftpsource = $sourcecode;
        $ftpsource =~ s/$$//;
        print "\nDEBUG: Reading code from ftp ditectory $ftpdir/$ftpsource\n" if ($debug);
        unless (open(FTPCODE,"$ftpdir/$ftpsource")) {
            print "USERFTP: cannot chdir to directory $ftpdir" if ($debug);
        }
        while(<FTPCODE>) {
            print SOURCECODE;
        }
        close(FTPCODE);
    }else {
        open(EXAMPLECODE,"function.c");
        while(<EXAMPLECODE>) {
```

APPENDIX C-continued

```
              print SOURCECODE;
            }
            close(EXAMPLECODE);
        }
        close(SOURCECODE);
        print "<P>DEBUG: sourcecode file is $sourcecode<p>\n" if ($debug);
        $output='/bin/date';
        print "$output";
        ####$codename = $sourcecode . $$;
        ####$codefile = $codename . ".c";
DEBUG SECTION #####
#print "<br>";
#$userlength = length( $FORM{usersourcecode});
#print "length of user code is $userlength things";
#for $key (sort keys %ENV){
#print "$key=$ENV{$key}\n<br>";
#}
print "<br>";
DEBUG SECTION #####
        print "<HR>\n";
        if( $userlength >$lengthlimit) {
            print "<H2>Sorry, your code is longer than $lengthlimit characters.</H2>";
            print "<H2>Please try a smaller piece of code.</H2>";
            unlink("$codedir/$sourcecode");
            exit;
        }
            #DEBUG print "SourceCodename is $sourcecode";
            # Assemble proper command string based on user-supplied options.
            # At same time create dynamic html links.
            $arg_1 = ""; # arg_1 is for either -k (save assembly code) or -s (interlist) flag.
            $arg_2 = ""; # arg_2 is for -l rts30.lib (include run-time support) argument.
            $arg_3 = ""; # arg_3 is for -z (link) flag.
        if( $FORM{vasm}eq "yes" ) {
            $arg_1 = "-k"; # Save asm code flag
            $link_1 = "<LI>View Assembly Code\n"; # Create HTML link for later use.
        }
        if( $FORM{vinter}eq "yes" ) {
            $arg_1 = "-s"; # Interlist flag.
            $link_1 = "<LI>View Interlist (mixed source. & assembly) Code\n"; # Create HTML link
for later use.
        }
        if( $FORM{linklib}eq "yes" ) {
            $arg_2 = "-l" . $toolsdir. "/rts30.lib"; # Link rts30 library flag.
        }
        if( $FORM{link}eq "yes" ) {
            $arg_3 = "-z -o" . $tmpdir . "/" . "$outfilename" ; # Linker & output file flag.
        }
        # (Note: Interiist flag forces a save of asm code.)
        $cmdstring = "cl30 " . $codedir . "/" . $sourcecode . $arg_1 . $arg_3 . $arg_2;
        # Display HTML links to dynamically generated sections.
        #print "<UL>\n";
        #print "<LI><A HREF=\"#clout\">View Compiler/Linker Output Code</A>\n";
        #print "<LI><A HREF=\"#vasm\">View Assembly Code</A>\n" if( $FORM{vasm}eq "yes"
);
        #print "<LI><A HREF=\"#vinter\">View Interlist (mixed source & assembly) Code</A>\n"
if ($FORM{vinter}eq "yes");
                #print "<LI><A HREF=\"#vsizobj\">View Size of Object Code</A>\n" if (
$FORM{vsizobj}eq "yes");
                #print "<LI><A HREF=\"#vsizout\">View Size of Load Module</A>\n" if (
$FORM{vsizout}eq "yes");
        #print "</UL>\n";
        #print "<HR>\n";
        ###DEBUG print "DEBUG: cmdstring before striping is:<br>$cmdstring<br>";
        # Display the command string for the user to see.
        # First strip out paths the user needn't see.
$usrcmdstring = $cmdstring;
# Escape slashes in paths used. SHOULD make routine for this in future!
$codedirx = $codedir . "/";
$codedirx =~ s/\//\\\//
$tmpdirx =~ $tmpdir . "/";
$tmpdirx =~ s/\//\\\//;
$toolsdirx = $toolsdir . "/";
$toolsdirx =~ s/\//\\\//;
$usrcmdstring =~ s/$codedirx//;
$usrcmdstring =~ s/$tmpdirx//;
$usrcmdstring =~s/$toolsdirx//;
$cmdstring = $usrcmdstring;
# Strip off process number from file names.
$usrcmdstring =~ s/$$//g;
```

APPENDIX C-continued

```
###DEBUGprint "usrcmdstring is $usrcmdstring<p>";
print "For the options you chose, the command line you would use would be:\n<p>";
print "<center><b>$usrcmdstring</b></center><P>";
# Run compiler/linker and display output.
if( $FORM{link}eq "yes" ) {
    $temp = "Compiler/Linker";
}
else ($temp = "Compiler"; }
print "<HR>";
print "<center><H2>$temp Output\n</H2></center>";
$output = `cd $toolsdir; $cmdstring`;
$output =~ s/$basecodename/$origname/ig;
print "<PRE>$output</PRE>";
print "<HR>";
# Display assembly/inter-list if requested.
if( $FORM{vasm}eq "yes" || $FORM{vinter}eq "yes" ) {
    if( $FORM{vasm}eq "yes" ) {$temp = "Assembly Code" };
    if( $FORM{vinter}eq "yes" ) {$temp = "Interlist (Source/Assembly Code)" };
    print "<center><H2>$temp Output\n</H2></center>";
    print "<PRE>";
    $asmfilename = $codedir . "/" . $basecodename. ".asm";
    ###DEBUG print "asmfilename is $asmfilename<\n";
    open( ASMLIST, "$asmfilename") || die "Can't open assembly code file\n";
    while( <ASMLIST>) {
        s/$basecodename/$origname/ig;
        print $_;
    }
    *print "</PRE>";
    print "<HR>";
}
# Print size of obj file if required.
if( $FORM{vsizobj}eq "yes" || $FORM{vsizoutr}eq "yes" ) {
    print "<center><h2>Output File Size</h2></center>";
    }
    if( $FORM(vsizobj}eq "yes" ) {
        ##$basename = $sourcecode;
        ##$basename =~ s/\.c//i;
        $objfilename $basecodename . ".obj";
        $tempname = $objfilename;
        $tempname =~ s/$$//;
        $filename = $codedir. "/" . $objfilename;
        ###DEBUGprint "filename is $filename<P>";
($dev,$ino,$mode,$nlink,$uid,$gid,$rdev,$size,$atime,$mtime,$ctime,$blksize,$blocks) =
stat("$filename");
        print "<A NAME=#vsizobj> The size of the object file <em><b>$tempname</b></em>
is $size bytes<P></A>";
    }
    # Print size of Load module if required
    if( $FORM{vsizout}eq "yes" && $FORM{link}eq "yes" ) {
        $tempname = $outfilename;
        ###DEBUGprint "DEBUG outfilename is $outfilename<P>";
        $tempname =~ s/$$//;
($dev,$ino,$mode,$nlink,$uid,$gid,$rdev,$size,$atime,$mtime,$ctime,$blksize,$blocks) =
stat("$toolsdir/$outfilename");
        print "<A NAME=#vsizout> The size of the load file <em><b>$tempname</b></em>
is $size bytes<P></A>";
ad
    }
    #
    # FTP files to workstation if requested.
    #
    print "<hr>";
    print "<P>";
    print "If you are satisfied with the results of your";
    print "compilation, you may proceed to the EVM where you";
    print "can run the code on actual hardware.";
    $mycodename = $basecodename;
    $mycodename =~ s/$$//;
    print "<P>Remember! The name of your code is <b>$mycodename</b>.<br>";
    #
    # ALWAYS Copy all files to a temp staging directory.
    #
    $stagedir = "/export/home/tmp/$$";
    mkdir("$stagedir",0777);
    print "<P><A HREF=\"/cgi-wsti/xfercodex.pl/$stagedir\">Access EVM</A> ";
    # write code to temp staging directory.
    ©_file("$toolsdir/$outfilename", "$stagedir");
    ©_file("$codedir/$sourcecode", "$stagedir");
    ©_file("$codedir/$objfilename", "$stagedir");
```

APPENDIX C-continued

```
        &copy_file("$asmfilename", "$stagedir");
        # Remove temp files
        unlink("$toolsdir/$outfilename");
        unless ($debug) {unlink("$codedir/$sourcecode"); }
        unlink("$codedir/$objfilename");
        unlink("$asmfilename");
}
else {
                    # Format an error message for the user
        print "Content-type: text/html\n\n";
        print "<HTML>\n";
        print "<HEAD>\n";
        print "<TITLE>Compile Input Form Error</TITLE>\n";
        print "</HEAD>\n";
        print "<BODY>\n";
        print "<H1>Compile Input Form Error</H1>\n";
        print "<HR>\n";
        print "<P>\n";
        print "An error was encountered and you form input was not proccessed. Please mail your";
        print "remarks to $webmaster\n";
        print "</BODY>\n";
        print "</HTML>\n";
}
# Retore old path
$ENV{"PATH"}= $oldpath;

# This routine copies files to a temporary area
# and strips process ID's from destination files.

sub copy_file {
        # Arg list: full path input file name, destination directory
        $stagedir = $_[1];
        $incode = $_[0];       ###"$toolsdir/$outfilename";
        $outcode = "$incode";
        $outcode =~ s/.*\///;
        $outcode =~ s/$$//;
        $outcode = "$stagedir/" . "$outcode";
        if ($debug) {
            print "<h1>stagedir is $stagedir</h1>";
            print "<h1>incode is $incode</h1>";
            print "<h1>outcode is $outcode</h1>";
        }
        unless (open(INCODE,"$incode")) {
            print "ERROR cannot open $incode for reading<P>\n" if ($debug);
        }
        unless (open(OUTCODE ,">$outcode")) {
            print "ERROR cannot open $outcode for writing<P>\n" if ($debug);
        }
        while(<INCODE>) {print OUTCODE; }close(INCODE); close(OUTCODE);
}
```

APPENDIX D xfercode.pl xfercode.pl (Perl)-- transfers the output files in the staging directory via FTP to the appropriate EVM, in this case to EVM1. Once the transfer is complete, the Gateway page is printed and displayed to the user. The gateway page contains step-by-step instructions on how to proceed through the gateway, an EVM command summary for the debugging tool and the actual links to connect to the EVMs with either audio or text help.

```
#!/bin/perl

# Script to transfer files to workstation
# and present html page for workstation access.

########################
# Constant Declarations #
########################
# set env variables for ti tools
$oldpath = $ENV{"PATH"}; # Save previous path.
$ENV{"PATH"}= "/bin:/usr/bin:/tools_dir";
# Workstation IP Address
$wsaddr = "198.3.252.20";
# Temporary ftp script file.
$ftpscript = "/tmp/ftp$$";
```

APPENDIX D-continued

```perl
# Username and Password for workstation FTP connection.
$ftpusername = "anonymous";
$ftppassword = "\n";
# Workstation directory where code is to go.
$codedir = "code";
# File for loggin file transfers.
$wslogfile = "/www/log/wsxferlog";
# HTML page which provides EVM access.
$accesspage = "http://www.dsplab.com/cgi-wsti/check_reservews.pl";
###$accesspage = "http://www.dsplab.com/Welcome2.html";
# Debug Flag. Debug = 1 turns on debug output.
$debug = 0;
###############
# Begin Script #
###############
# Extract name of temp directory where the files are.
# This is passed as an option to script invocation.
$tempdir = $ENV{"PATH_INFO"};
# Write the script for the FTP session.
open(FTP,">$ftpscript") || die "cannot open $ftpscript for writing\n";
print FTP "$ftpusername\n";
print FTP "$ftppassword\n";
print FTP "prompt\n";
print FTP "bin\n";
print FTP "cd c:\\\\$codedir\n";
print FTP "mput *\n".
###print FTP "dir\n";
print FTP "quit\n";
close(FTP);
# Change to directory where the source files are located
# and run the FTP session.
chdir("$tempdir");
#$ftpout = 'ftp $wsaddr < $ftpscript';
if ($debug) {
    print "Content-type: text/html\n\n";
    print "<h1>tempdir is $tempdir</h1>";
    print "<pre>";
    print "$ftpout";
}
else {
    #print "Content-type: text/html\n\n";
    #print "<h1>tempdir is $tempdir</h1>";
    #print "hi";
    print "Location: $accesspage\n\n";
}
exit;
# Make a list of the files sent to the workstation
opendir(Dir, $tempdir) || die "Cannot read directory: $tempdir\n";
@files = sort grep(!/^\.\.?$/, readdir(Dir));
closedir(Dir);
#Get a time stamp.
$datetime = 'date "+%m/%d/%y %T"';
chop($datetime);
# Write time-stamped list of file transfers to log file.
open(XFERLOG,">>wslogfile") || die "Cannot read user file: $wslogfile";
for $filename (@files)
{
    print XFERLOG "$datetime $filename\n";
}
close(XFERLOG);
# Delete FTP script file.
unlink("$ftpsdript");
exit;
c3x_telnets.html
``` c3x_telnets.html (html) -- Access page to the EVMs. Links for audio help steps can be seen. The Telnet applet implemented in Java is loaded and is directed to make a connection with www.dsplab.com. Once connected, the user is instructed to log into the appropriate EVM. No password is given. The Java Telnet client supplies a "Disconnect" button for quick disconnection.

```html
<html>
<title> Telnet Applet to TechOnLine VirtuaLab</title>
<frameset cols="115,*">
        <frame  marginheight="2" marginwidth="2" noresize src="c3x_sound.html"
            scrolling="auto">
        <frame  marginheight="10" marginwidth="10" noresize src="telnet.html">
</frameset>
</html>
```

APPENDIX D-continued

Additional Scripts c3x_sound.html

```
<html><body bgcolor="#000000" text="#ffffff" link="#ffffff"
vlink="#ff0000"><center><b>Audio<BR>Assistance</b><hr><font size="-1"><a
href="/rafiles/welcomec3x.ra">Welcome</a><P><a href="/rafiles/evm12step1.ra">Step
1</a><BR>
<a href="/rafiles/step2.ra">Step 2</a><BR>
<a href="/rafiles/step3.ra">Step 3</a><BR>
<a href="/rafiles/step4.ra">Step 4</a><BR>
<a href="/rafiles/step5.ra">Step 5</a><BR>
<a href="/rafiles/step6.ra">Step 6</a><BR>
<a href="/rafiles/step7.ra">Step 7</a>
<BR>
<BR>
<a href="help/troubleshooting.html"
target="help">Troubleshooting</a><BR></font><p></html>
``` telnet.html

```
<body bgcolor=#ffffff text=#000000>
<title>Telnet Applet to TechOnLine VirtuaLab</title>
<body bgcolor="#000000">
<center>
<applet code=Telnet.class width=648 height=385>
<param name=host value="www.dsplab.com">
<param name=portvalue=23>
</applet><br>
</center>
```

.profile

The .profile (UNIX shell) of the evmX account on the SUN is designed to automatically connect to the appropriate Windows 3.1 client and start a debugger session using the appropriate tools discussed above. Once the debugger session ends, all connections to the EVM are broken and the user is disconnected.

```
telnet 198.3.252.105 <&0
        exit
``` evm_management.pl

```
#!/usr/bin/perl
push (@INC, "/www/cgi-bin");
require "config.pl";
for ($i = 1; $i <= $MaxEVM; $i++) {
    $FileName = $RootEVMdir . $EVM[$i-1]. "/" . $PID;
    if (-e $FileName) {
        kill -9, `cat $FileName`;
        unlink ($FileName);
    }
    $FileName = $RootEVMdir . $EVM[$i-1] . "/" . $Client;
    if (-e $FileName) {
        unlink ($FileName);
    }
}
```

/etc/httpd.conf

```
#       Conf file f6r DSPlab Webserver
#       John Irza, 9/11/95

#       Sample configuration file for cern_httpd for running it
#       as a normal HTTP server.

# See:
#       <http://info.cern.ch/hypertext/WWW/Daemon/User/Config/Overview.html>

# for more information.

# Written by:
#       Ari Luotonen April 1994 <luotonen@dxcern.cern.ch>

#       Set this to point to the directory where you unpacked this
#       distribution, or wherever you want httpd to have its "home"

ServerRoot    /home2/www

#       The default port for HTTP is 80; if you are not root you have
#       to use a port above 1024; good defaults are 8000, 8001, 8080

```

APPENDIX D-continued

```
Port   80

#      General setup; on some systems, like HP, nobody is defined so
#      that setuid() fails; in those cases use a different user id.

UserId        nobody
GroupId       nogroup
HostName      www.dsplab.com
PidFile       /www/etc/httpd-pid
Enable        GET HEAD POST
IdentityCheck Off
AlwaysWelcome On
Welcome       Welcome.html index.html

#      Logging; if you want logging uncomment these lines and specify
#      locations for your access and error logs

LogFileDateExt log
AccessLog     /var/log/http
ErrorLog      /var/log/http-errors
LogFormat     Common
LogTime       LocalTime

#      User-supported directories under ~/public_html

UserDir public_html
#Protection PROT-SETUP-DSPWS {
#      ServerId      dsplab
#      AuthType      Basic
#      Passwd File   /www/etc/dspws.passwd
#      GroupFile     /www/etc/group
#      GetMask       All
#}
#Protection PROT-SETUP-USERS {
#      ServerId      DSPlab
#      AuthType      Basic
#      PasswdFile    /WWW/etc/virtual-lab.passwd
#      GroupFile     /www/etc/group
#      GetMask       All
#}
#Protect /dspws/*          PROT-SETUP-DSPWS
#Protect /cgi-ws/*         PROT-SETUP-DSPWS
#Protect /cgi-wsti/*       PROT-SETUP-USERS
#Protect /dspws/ti/*       PROT-SETUP-USERS
#Protect /ti/*             PROT-SETUP-USERS
#Protect /cgi-prv/*        PROT-SETUP-USERS
#      URL translation rules; If your documents are und

#      Scripts; URLs starting with /cgi-bin/ will be understood as
#      script calls in the directory /your/script/directory

Exec    /cgi-bin/*     /www/cgi-bin/*
Exec    /cgi-prv/*     /www/cgi-prv/*
Exec    /htbin/*       /www/bin/*
Exec    /cgi-bin2/*    /www/cgi-bin2/*
Exec    /cgi-prv2/*    /www/cgi-prv2/*
Exec    /cgi-ws/*      /www/cgi-prv2/ws/*
Exec    /cgi-wsti/*    /www/cgi-prv2/ws/ti/*
#      URL translation rules; If your documents are under /local/Web
#      en this single rule does the job:

Pass    /*     /home2/www/*
```

What is claimed is:

1. A system for evaluating a component by accessing a prototype of said component over a network, said system comprising:

an interface for enabling an end user to access over a network a hardware evaluation module that is configured as a prototype of the component;

means for providing the hardware evaluation module a set of instructions based on information provided by the end user;

means for controlling the hardware evaluation module when processing the set of instructions; and means for transferring a result to the interface that indicates a capability of the hardware evaluation module based on the actions performed by the hardware evaluation module to process the set of instructions.

2. The system of claim 1, wherein the hardware evaluation module processes the set of instructions using at least one additional component.

3. The system of claim 1, wherein the means for providing the set of instructions to the hardware evaluation module provides the set of instructions based on a file transfer protocol.

4. A system for evaluating a component through remote access by an end user to a prototype of said component over a network, said system comprising:
- an end user interface for enabling an end user to access over a network a hardware evaluation module that is configured as a prototype of the component;
- means for formulating a test for the hardware evaluation module based on information provided by the end user;
- means for compiling the test into code that is executable by the hardware evaluation module;
- means for transferring the code to the hardware evaluation module; and
- means for transferring over the network to the end user interface information indicating a performance of the hardware evaluation module based on the hardware evaluation module executing the code.

5. A method for evaluating performance of a component based on testing via a network a prototype of said component, said method comprising:
- providing an end user interface for enabling an end user to access over a network a hardware evaluation module that is configured as a prototype of the component;
- formulating a test for the hardware evaluation module based on information received from the end user interface;
- compiling the test into code that is executable by the hardware evaluation module;
- transferring the code to the hardware evaluation module;
- measuring actions performed by the hardware evaluation module to execute the code; and
- transferring over the network to the end user interface information indicating a performance of the hardware evaluation module for the test based on the measurements of the actions performed by the hardware evaluation module.

6. A method for facilitating remote access by an end user to estimate performance of a component based on evaluating via a network a prototype of said component, said method comprising:
- providing an end user interface for enabling an end user to access over a network a hardware evaluation module that is configured as a prototype of said component;
- formulating a test that includes code that is executable by the hardware evaluation module, based on information provided through the end user interface;
- determining performance of the hardware evaluation module based on actions performed by the hardware evaluation module when executing the code; and
- transferring information indicating the performance of the hardware evaluation module for the test to the end user interface.

7. A system for evaluating a component based on testing at least one prototype of said component, said system comprising:
- a first processor for receiving a request to execute at least one set of instructions on a selected hardware evaluation module, wherein the selected hardware module is configured as a prototype of the component; and
- at least one additional processor, coupled to the first processor, for routing the at least one set of instructions to the selected hardware evaluation module based on the request, and for obtaining a result that indicates actions performed by the hardware evaluation module when executing the at least one set of instructions.

8. The system of claim 7, wherein the hardware evaluation module is coupled to at least one additional component of hardware.

9. The system of claim 7, further comprising:
- a client, coupled to the first processor, for providing the request over a network.

10. The system of claim 9, wherein the first processor requests information indicating a condition of communications between the client and first processor.

11. The system of claim 9, wherein the at least one additional processor routes the at least one set of instructions to either the selected hardware evaluation module or a component of software emulating the hardware evaluation module based on a condition of communications between the client and first processor.

12. A system for evaluating a component based on testing a prototype of the component, said system comprising:
- a server for receiving a request to conduct a test on a selected hardware evaluation module that is configured as a prototype of the component; and
- a processor, coupled to the server, for compiling the test into at least one set of instructions, for routing the at least one set of instructions to the selected hardware evaluation module based on the request, and for obtaining a result that indicates actions performed by the hardware evaluation module when executing the at least one set of instructions.

13. The system of claim 12, wherein the processor controls the hardware evaluation module based on information received by the server.

14. A method for evaluating performance of a component based on testing at least one prototype of the component, said method comprising:
- receiving a request to execute a set of instructions;
- selecting at least one of a plurality of prototypes based on the request, wherein the plurality of prototypes includes at least one hardware evaluation module that is configured for prototyping the component;
- executing, at the selected prototype, the set of instructions;
- measuring actions performed by the selected prototype when executing the set of instructions; and
- determining information indicating a performance of the selected prototype based on the measurements of the actions performed by the selected prototype when executing the set of instructions.

15. The method of claim 14, wherein receiving the request further comprises receiving information identifying a user.

16. The method of claim 15, wherein selecting at least one of the plurality of prototypes comprises determining whether the user is authorized to access the at least one hardware evaluation module based on the information identifying the user.

17. A method for evaluating performance of a component based on testing a selected prototype of the component, comprising:
- receiving a request from a client to execute a set of instructions;
- determining information indicating a condition of communications with the client;
- selecting either a hardware evaluation module that is configured for prototyping the component or a component of software that is configured for emulating the component as a prototype of the component based on the request and the condition of communications from the client;

measuring actions performed by the selected prototype when executing the set of instructions; and determining information indicating a performance of the selected prototype based on the measurements of the actions performed by the selected prototype when executing the set of instructions.

18. The method of claim 17, further comprising:

providing the information indicating the performance of executing the set of instructions to the client.

19. The method of claim 17, wherein selecting either the hardware evaluation module or the component of software as the prototype of the component comprises:

receiving information identifying a user at the client;

determining whether the user is authorized to access the hardware evaluation module based on the information identifying the user; and selecting either the hardware evaluation module or the component of software as the prototype of the component based on whether the user is authorized.

20. An apparatus for evaluating performance of a component based on testing a prototype of the component, said apparatus comprising:

means for receiving a request to execute at least one set of instructions on a selected hardware evaluation module that is configured as a prototype of the component;

means for routing the at least one set of instructions to the selected hardware evaluation module based on the request;

means for obtaining a result that indicates actions performed by the hardware evaluation module when executing the at least one set of instructions; and means for providing the result to the first processor.

21. An apparatus for evaluating performance of a component based on testing at least one prototype of the component, said apparatus comprising:

means for receiving a request to execute a set of instructions;

means for selecting at least one of a plurality of prototypes based on the request, wherein the plurality of prototypes includes at least one hardware evaluation module that is configured for prototyping the component;

means for providing to the selected prototype the set of instructions;

means for measuring actions performed by the selected prototype when executing the set of instructions; and means for determining information indicating a performance of the selected prototype based on the measurements of the actions performed by the selected prototype when executing the set of instructions.

22. An apparatus for evaluating performance of a component based on testing a selected prototype of the component, said apparatus comprising:

means for receiving a request from a client to execute a set of instructions;

means for determining information indicating a condition of communications from the client;

means for selecting either a hardware evaluation module that is configured for prototyping the component or a component of software that is configured for emulating the component as a prototype for the component based on the request and the condition of communications from the client;

means for measuring actions performed by the selected prototype when executing the set of instructions; and means for determining information indicating a performance of the selected prototype based the measurements of the actions performed by the selected prototype when executing the set of instructions.

* * * * *

UNITED STATES PATENT AND TRADEMARK OFFICE
CERTIFICATE OF CORRECTION

PATENT NO. : 6,708,327 B1  Page 1 of 1
DATED : March 16, 2004
INVENTOR(S) : Amnon Aliphas It is certified that error appears in the above-identified patent and that said Letters Patent is hereby corrected as shown below:

Column 34,
Line 33, "based the" should read -- based on the --.

Signed and Sealed this

First Day of June, 2004

JON W. DUDAS
*Acting Director of the United States Patent and Trademark Office*